United States Patent
Lee et al.

(10) Patent No.: US 8,954,096 B2
(45) Date of Patent: Feb. 10, 2015

(54) METHOD AND APPARATUS FOR DETECTING INSERTION OF SIM CARD IN A PORTABLE TERMINAL

(75) Inventors: Gwang-Hui Lee, Gyeongsangbuk-do (KR); Min-Soo Kim, Gyeongsangbuk-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 71 days.

(21) Appl. No.: 13/240,044

(22) Filed: Sep. 22, 2011

(65) Prior Publication Data

US 2012/0083316 A1    Apr. 5, 2012

(30) Foreign Application Priority Data

Sep. 30, 2010 (KR) .................. 10-2010-0095643

(51) Int. Cl.
  *H04B 1/38* (2006.01)
  *G06K 7/00* (2006.01)

(52) U.S. Cl.
  CPC ............ *G06K 7/0021* (2013.01); *G06K 7/0069* (2013.01)
  USPC ........... 455/458; 455/410; 455/411; 455/557; 455/559; 439/630; 439/631; 439/67; 702/57; 702/58; 702/64

(58) Field of Classification Search
  USPC .......... 455/410, 411, 557–559; 439/630–637, 439/67; 702/57–64
  See application file for complete search history.

(56) References Cited

U.S. PATENT DOCUMENTS

| | | | |
|---|---|---|---|
| 5,424,690 A * | 6/1995 | Ohno | 331/57 |
| 5,436,862 A * | 7/1995 | Sanemitsu | 365/189.16 |
| 5,463,210 A | 10/1995 | Imura | |
| 5,599,203 A * | 2/1997 | Broschard, III | 439/489 |
| 5,712,472 A * | 1/1998 | Lee | 235/486 |
| 5,864,695 A * | 1/1999 | Yanagihara | 713/500 |
| 5,945,662 A | 8/1999 | Vallat | |
| 5,969,329 A | 10/1999 | Vallat | |
| 6,035,357 A * | 3/2000 | Sakaki | 710/301 |
| 6,226,189 B1 * | 5/2001 | Haffenden et al. | 361/814 |
| 6,271,675 B1 * | 8/2001 | Sakaki | 324/762.02 |
| 6,304,454 B1 * | 10/2001 | Akamatsu et al. | 361/752 |
| 6,612,498 B1 * | 9/2003 | Lipponen et al. | 235/486 |
| 6,792,536 B1 * | 9/2004 | Teppler | 713/178 |
| 6,913,198 B2 | 7/2005 | Ruat et al. | |
| 7,731,539 B2 * | 6/2010 | Ooaku | 439/630 |
| 2001/0007803 A1 * | 7/2001 | Wilson | 439/633 |
| 2001/0024066 A1 * | 9/2001 | Fu et al. | 307/116 |
| 2001/0034246 A1 * | 10/2001 | Hutchison et al. | 455/557 |
| 2002/0179707 A1 | 12/2002 | Omet | |

(Continued)

FOREIGN PATENT DOCUMENTS

DE    195 23 275 C1    12/1996

*Primary Examiner* — Mehmood B Khan
(74) *Attorney, Agent, or Firm* — Cha & Reiter, LLC

(57) ABSTRACT

A method and apparatus for detecting insertion of a Subscriber Identity Module (SIM) card in a portable terminal are provided, in which a SIM card is inserted into a SIM card connector, and a controller continuously supplies an operating voltage to a predetermined pin of the SIM card connector, determines whether a voltage level of the predetermined pin of the SIM card connector changes in a predetermined pattern, and determines that the SIM card has been inserted into the SIM card connector if the voltage level of the predetermined pin of the SIM card connector changes in the predetermined pattern.

9 Claims, 4 Drawing Sheets

(56) References Cited

U.S. PATENT DOCUMENTS

| | | | |
|---|---|---|---|
| 2003/0154326 A1* | 8/2003 | Tseng et al. | 710/1 |
| 2005/0020137 A1* | 1/2005 | Tanaka et al. | 439/630 |
| 2006/0143352 A1 | 6/2006 | Park | |
| 2006/0172573 A1* | 8/2006 | Laitinen et al. | 439/159 |
| 2008/0220745 A1* | 9/2008 | Chang | 455/412.2 |
| 2008/0296376 A1 | 12/2008 | Kim | |
| 2009/0088211 A1* | 4/2009 | Kim | 455/558 |
| 2012/0270602 A1* | 10/2012 | Card | 455/558 |

* cited by examiner

METHOD AND APPARATUS FOR DETECTING INSERTION OF SIM CARD IN A PORTABLE TERMINAL

CLAIM OF PRIORITY

This application claims, pursuant to 35 USC 119(a), priority to, and the benefit of the earlier filing date of, that patent application filed in the Korean Intellectual Property Office on Sep. 30, 2010 and assigned Ser. No. 10-2010-0095643, the contents of which are incorporated herein by reference.

BACKGROUND OF THE INVENTION

1. Field of the Invention

The present invention relates to the field of portable devices, and more particularly, to a method and apparatus for detecting insertion of a Subscriber Identity Module (SIM) card in a portable device.

2. Description of the Related Art

At present, Global System for Mobile communications (GSM) and Code Division Multiple Access (CDMA) are major wireless technologies for portable terminals. Most of Europe uses GSM, whereas CDMA is the most dominant standard in the U.S. Modifications of GSM and CDMA are also used. In some areas, multiple communication technologies are used jointly or in combination, for portable terminals.

Accordingly, recent portable terminals support dual modes or dual-standby functions so that a plurality of communication networks can be used with a single portable terminal.

A dual-mode portable terminal is booted selectively to one of a plurality of communication modes to thereby selectively use communication networks conforming to different communication standards, such as CDMA and GSM communication networks.

Unlike a dual-mode portable terminal, a dual-standby terminal can simultaneously use a plurality of communication networks (e.g. CDMA and GSM communication networks) without being booted selectively to one of the communication networks.

Each of the dual-mode portable terminal and the dual-standby portable terminal has one or more SIM cards inserted. For using a SIM card, the portable terminal needs to detect its insertion.

Conventionally, a separately configured sensor senses insertion of a SIM card. The use of the additional sensor requires additional hardware and increases fabrication cost.

Therefore, if insertion of a SIM card can be detected without using such an additional sensor(s), a portable terminal in which at least one SIM card is inserted, (i.e., a conventional, single mode portable terminal, a dual-mode portable terminal and/or a dual-standby portable terminal) can be fabricated smaller with lighter weight and for less cost.

SUMMARY OF THE INVENTION

An aspect of embodiments of the present invention is to address at least the problems and/or disadvantages described and to provide at least the advantages described below. Accordingly, an aspect of embodiments of the present invention is to provide a method and apparatus for detecting insertion of a Subscriber Identity Module (SIM) card without using an additional sensor.

In accordance with an embodiment of the present invention, there is provided an apparatus for detecting insertion of a SIM card in a portable terminal, in which a SIM card is inserted into a SIM card connector, and a controller supplies an operating voltage to a predetermined pin of the SIM card connector, determines whether a voltage level of the predetermined pin of the SIM card connector changes in a predetermined pattern, and determines that the SIM card has been inserted into the SIM card connector if the voltage level of the predetermined pin of the SIM card connector changes in accordance with the predetermined pattern.

In accordance with another embodiment of the present invention, there is provided a method for detecting insertion of a SIM card in a portable terminal, in which it is determined whether a voltage level of a predetermined pin of a SIM card connector changes in a predetermined pattern, while continuously supplying an operating voltage to the predetermined pin of the SIM card connector, and if the voltage level of the predetermined pin of the SIM card connector changes in accordance with the predetermined pattern, it is determined that the SIM card has been inserted into the SIM card connector.

BRIEF DESCRIPTION OF THE DRAWINGS

The above and other objects, features and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE INVENTION

A detailed description of a generally known function and structure of the present invention will be avoided lest it should obscure the subject matter of the present invention. The terms described below are defined in connection with the function of the present invention. The meaning of the terms may vary according to the user, the intention of the operator, usual practice, etc. Therefore, the terms should be interpreted based on their ordinary use in light of the teachings provided in the specification.

Figure 1:
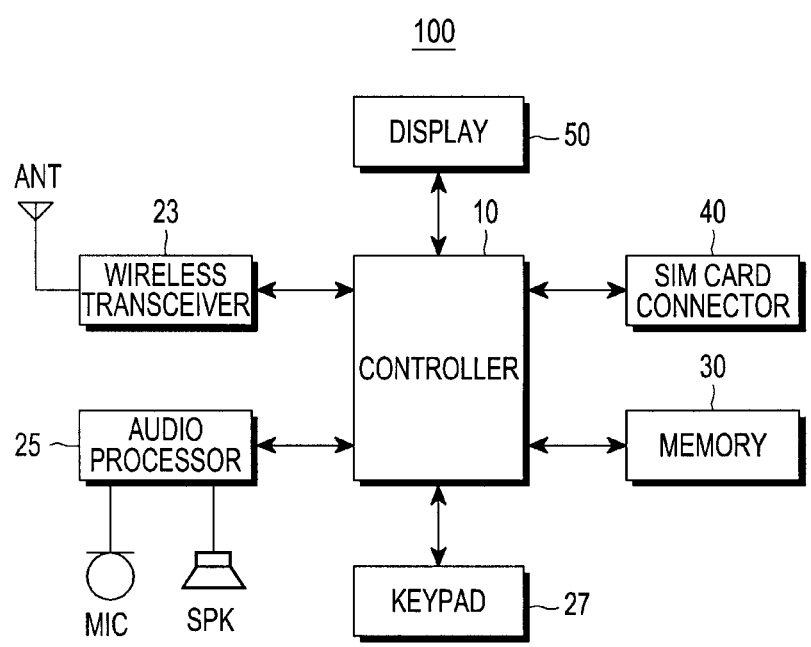
FIG. 1 is a block diagram of a portable terminal according to an embodiment of the present invention.

FIG. 1 is a block diagram of a portable terminal 100 according to an embodiment of the present invention. Although components of a portable terminal such as a Global Positioning System (GPS) module, a camera module, a Bluetooth module, a Wireless Fidelity (Wi-Fi) module, an acceleration sensor, a proximity sensor, a geo-magnetic sensor, and a Digital Multimedia Broadcasting (DMB) receiver are not shown in FIG. 1, it is clearly understood to those skilled in the art that they may be included in the portable terminal and provide their own functionalities without altering the principles of the invention described herein.

In accordance with an embodiment of the present invention, the term "portable terminal" refers to a broad range of mobile terminals including a video phone, a mobile phone, a smart phone, an International Mobile Telecommunications (IMT)-2000 terminal, a Wideband Code Division Multiple Access (WCDMA) terminal, a Personal Digital Assistant (PDA), a Portable Multimedia Player (PMP), a DMB terminal, a Personal Computer (PC) like a desktop computer and a laptop computer, etc. In addition, the portable terminal may be of a type that is single mode or dual mode, wherein a dual mode may access different communication protocols dependent upon the type so SIM card that is inserted.

Referring to FIG. 1, a wireless transceiver 23 includes a Radio Frequency (RF) module (not shown) and a Modulator/Demodulator (MODEM) (not shown). The RF module includes an RF transmitter for upconverting the frequency of a transmission signal and amplifying the upconverted signal and an RF receiver for low-noise-amplifying a received signal and downconverting the frequency of the low-noise-amplified signal (not shown). The MODEM includes a transmitter for encoding and modulating the transmission signal and a receiver for demodulating and decoding the signal received from the RF module. It would be recognized by those skilled in the art that in the embodiment of the present invention described herein, the wireless transceiver 23 supports heterogeneous communication networks such as Code Division Multiple Access (CDMA) and Global System for Mobile communications (GSM) communication networks and, when needed, may include a plurality of antennas (ANT) to support both CMDA and GSM operational frequency bands An audio processor 25 may include a Coder-Decoder (CODEC). The CODEC includes a data CODEC and an audio CODEC. The data CODEC processes packet data and the audio CODEC processes an audio signal such as voice and a multimedia file. The audio processor 25 reproduces an audio signal by converting a digital audio signal received from the MODEM to an analog signal through the audio CODEC, or converts an analog audio signal generated from a microphone (MIC) to a digital audio signal through the audio CODEC and transmits the digital audio signal to the MODEM. The CODEC may be configured separately or incorporated into a controller 10.

A keypad 27 may include alphanumerical keys for entering digits and characters and function keys for setting functions, or a touch pad. In accordance with the embodiment of the present invention, if a display 50 is configured into a touch screen, the keypad 27 may be omitted or include a minimum number of keys. In this case, the display 50 may be partially used as an input device.

A memory 30 may include a program memory and data memories (not shown). The program memory stores programs for controlling regular operations of the portable terminal. According to the embodiment of the present invention, the memory 30 may include an internal memory unit and/or an external memory such as a Compact Flash (CF) memory card, a Secure Digital (SD) card, a micro-SD memory card, a mini-SD memory card, an eXtreme Digital (XD) card, and a memory stick.

A SIM card (a Universal SIM (USIM) or micro USIM card) is connected to the controller 10 via a SIM card connector 40. In the embodiment of the present invention, the portable terminal is assumed to be a dual-mode or dual-standby portable terminal supporting a plurality of communication schemes. Therefore, a plurality of (e.g. two) SIM card connectors 40 may be included in the portable terminal. Through the plurality of SIM card connectors 40, a plurality of SIM cards may be inserted into the portable terminal, for use in a CDMA, GSM or Wideband CDMA (WCDMA) communication network. However, it would be understood that the processing described herein is also applicable to a single mode portable terminal using a SIM card.

A SIM card inserted into the SIM card connector 40 contains subscriber information, authentication information, and wireless communication records in relation to a communication network. Data of the SIM card is managed by a file system built with a Master File (MF), Dedicated Files (DFs), and Elementary Files (EFs). The MF is a root file of the file system. The DFs are sub-directories of the MF, supporting functions required for communication services, GSM operations, and CDMA operations. A DF has a plurality of EFs in which data used for each service is stored. An EF generically refers to any file required for execution of an application file of each DF. Subscriber information such as subscriber phone numbers, billing details, and frequently used phone numbers, and security-related authentication information are stored in the EFs.

The display 50 may be one of various types of displays such as a Liquid Crystal Display (LCD), an Organic Light Emitting Diode (OLED) display (e.g. a Passive Matrix OLED (PMOLED) or Active Matrix OLED (AMOLED) display), etc. In the embodiment of the present invention, the display 50 may also be a touch screen that can be used not only as an output device but also as an input device along with the keypad 27.

The controller 10 provides overall control to the operations of the portable terminal. The controller 10 switches one operation of the portable terminal to another operation according to a user input received through the keypad 27 or the display 50 and controls the operation switching. In accordance with the embodiment of the present invention, the controller 10 detects insertion of the SIM card into the SIM card connector 41 by sensing a variation in the voltage level of a predetermined pin of the SIM card connector 40. Then the controller 10 initializes the portable terminal through the inserted SIM card and, accesses a predetermined communication network.

Figure 2:
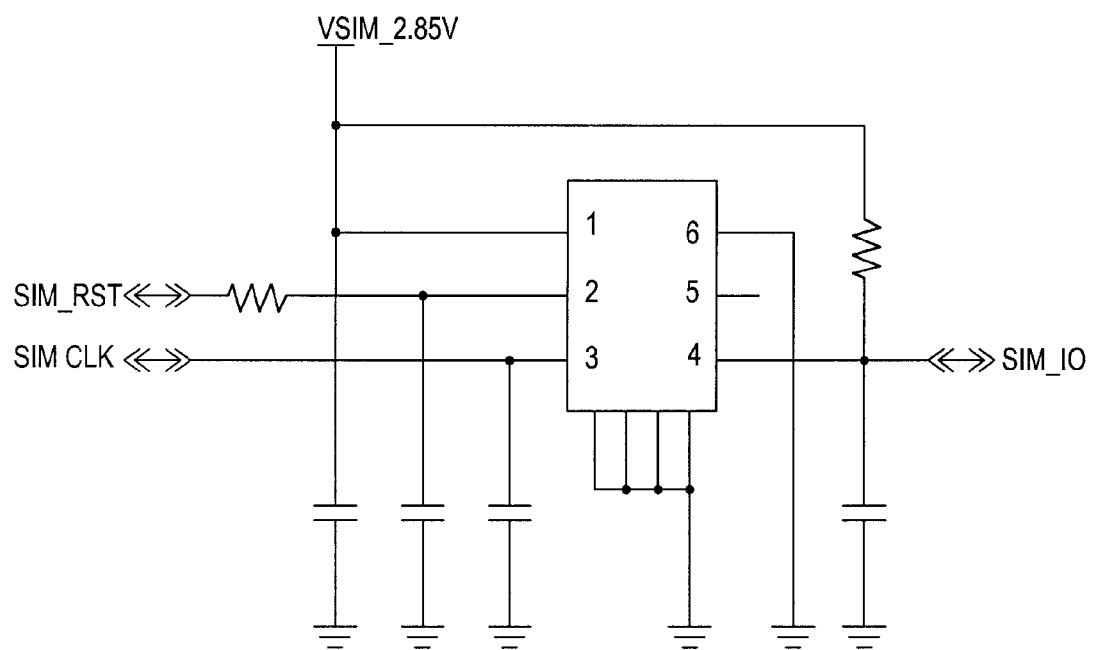
FIG. 2 is an exemplary circuit diagram of a pin layout in a Subscriber Identity Module (SIM) card.

FIG. 2 is an exemplary circuit diagram of a pin layout in a SIM card.

Referring to FIG. 2, the SIM card includes six pins, pin #1 to pin #6. Pin #1 is a SIM supply voltage pin for receiving the operating voltage of the SIM card, pin #2 is a SIM_RST (RESET) pin used for communications such as reception of a reset signal, pin #3 is a SIM_CLK (CLOCK) pin for communications such as reception of a clock signal, pin #4 is a SIM_IO (Input/Output) pin for communications such as transmission and reception of input and output signals (data), pin #5 is not connected because its usage is yet to be decided, and pin #6 is a Ground pin which provides a common ground level (e.g., a zero voltage level) between the SIM card and the SIM card connector 40.

Conventionally, when insertion of the SIM card into the SIM card connector 40 is sensed using an additional sensor, the portable terminal is initialized using information contained on the SIM card by applying an operating voltage to pin #1 and pin #4.

In the embodiment of the present invention, however, the controller 10 continuously supplies the operating voltage of the SIM card to pin #4 while the portable terminal is operating, for the reason described later with reference to FIG. 3.

FIG. 3 illustrates an exemplary pin structure for a SIM card 310 and an exemplary pin structure for a SIM card connector 315.

Figure 3A:
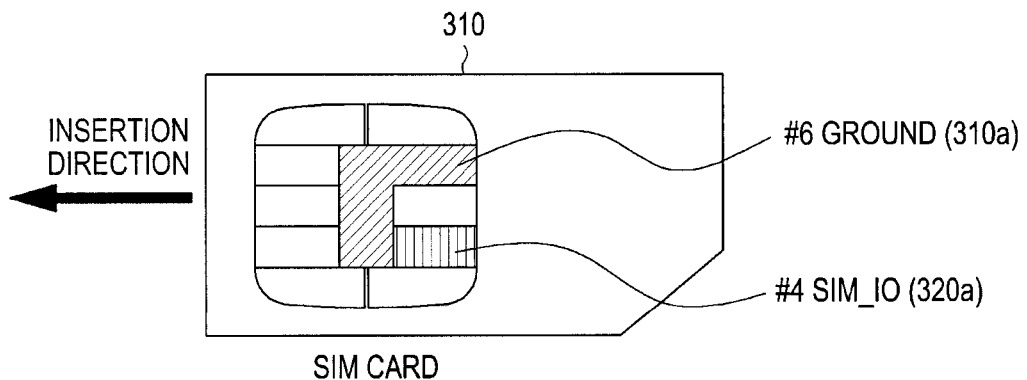
FIG. 3 illustrates an exemplary pin structure for a SIM card and an exemplary pin structure for a SIM card connector.
Figure 3B:
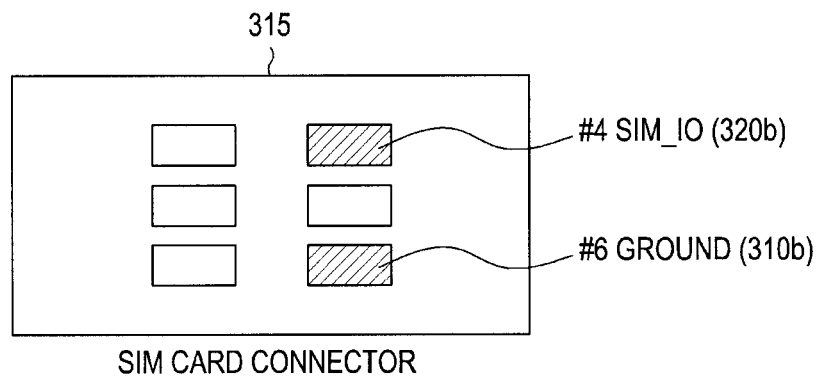

FIG. 3(a) illustrates a typical pin structures a SIM card 310 and FIG. 3(b) illustrates a pin structure for a corresponding SIM card connector.

When the SIM card 310 is inserted into the SIM card connector 315 in an insertion direction (as indicated by the arrow), each pin (e.g. pin #1 to pin #6) of the SIM card is electrically connected to its matching pin of the SIM card connector (e.g. pin #1 to pin #6).

An operating voltage is continuously supplied to a fourth pin 320b (pin #4, SIM_IO) of the SIM card connector, which implies that the electrical level of the SIM_IO pin 320b is always high.

On the assumption that the SIM_IO pin 320b is always electrically high before insertion of the SIM card, when the SIM card is inserted into the SIM card connector, a sixth pin 310a of the SIM card initially connects the fourth pin 320b of the SIM card connector electrically to a sixth pin 310b of the SIM card connector due to the shape (e.g. "⌐") of the sixth pin 310a of the SIM card in the embodiment of the present invention. That is, as the SIM card is inserted into the connector, the shape of pin #6 310a contacts both the fourth pin 320b and sixth pins 310b together and thus grounds any voltage on SIM_IO pin #4 320b.

Thus, in the course of inserting the SIM card into the SIM card connector 40 (not completely inserted), when the fourth pin 320b is electrically connected to the sixth pin 310b in the SIM card connector 40 by the sixth pin 310a of the SIM card, the electrical level of the fourth pin 320b of the SIM card connector 40 instantaneously goes to the ground level (typically an electrically low level).

Upon completion of the SIM card insertion, the fourth pin 320b is not electrically connected to the sixth pin 310b any longer in the SIM card connector 40. Because the operating voltage has been supplied to the SIM_IO (fourth pin) 320b of the SIM card connector 40, the voltage on the fourth pin 320b returns to the high level.

That is, while the SIM card is being inserted into the SIM card connector 40, the fourth pin 320b is electrically connected to the sixth pin 310b in the SIM card connector 40 due to the shape of the sixth pin 310a of the SIM card, wherein, the fourth pin 320b switches from a high condition to a low condition. And when the SIM card is completely inserted into the SIM card connector 40, the fourth pin 320b returns to the high condition.

Therefore, because the operating voltage is always supplied to the fourth pin 320b of the SIM card connector 40 in the present invention, when the SIM card is inserted into the SIM card connector 40, the insertion of the SIM card is sensed based on the principle that the power level of the fourth pin 320b is switched in a predetermined pattern, for example, in the pattern of high→low→high in the present invention. In this manner, insertion of the SIM card can be detected without using an additional sensor.

Figure 4:
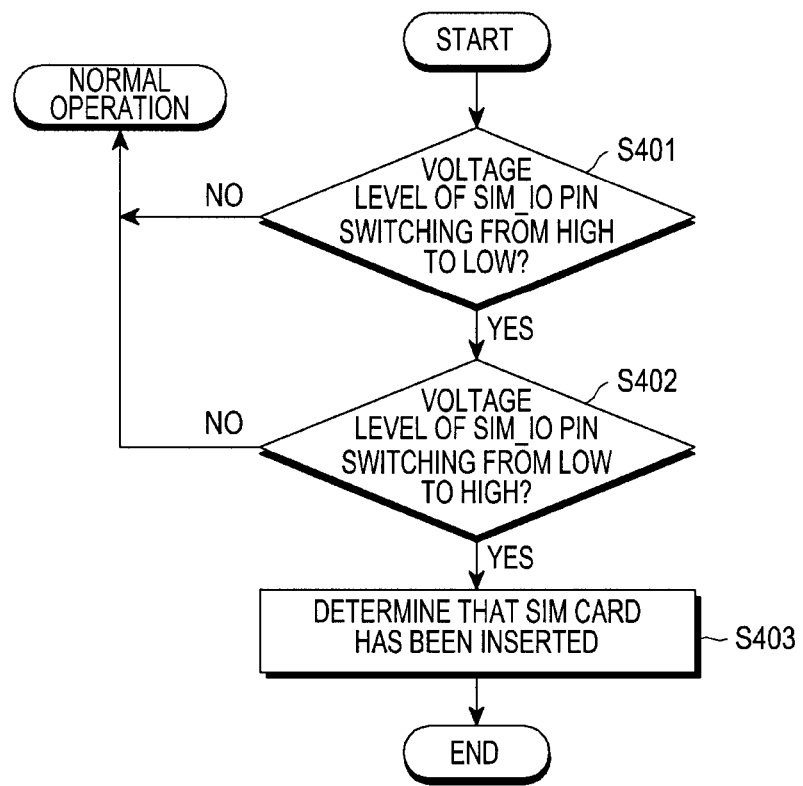
FIG. 4 is a flowchart illustrating an operation for sensing insertion of a SIM card in a portable terminal according to an embodiment of the present invention.

FIG. 4 is a flowchart illustrating an operation for sensing insertion of a SIM card in the portable terminal according to an embodiment of the present invention. With reference to FIGS. 1 to 4, sensing of SIM card insertion according to an embodiment of the present invention will be described below.

The controller 10 determines whether the SIM_IO pin of the SIM card connector 40 switches from high to low and then returns to high in steps S401 and S402.

As described before, the controller 10 controls continuous supply of the operating voltage of the SIM card to the fourth pin 320b, i.e. the SIM_IO pin of the SIM card connector 40 by controlling a power supply (not shown) so that the power level of the fourth pin 320b is always high.

Then the controller 10 determines whether the sixth pin 310a of the SIM card electrically connects the fourth pin 320b of the SIM card connector 40 to the sixth pin 310b of the SIM card connector 40 and thus the electrical level of the fourth pin 320b changes in a predetermined pattern (e.g. high→low→high).

In step S403, if determining that the electrical level of the fourth pin 320b of the SIM card connector 40 has been changed in the predetermined pattern, the controller 10 determines that the SIM card has been inserted.

Then, the controller 10 access information on the determined SIM card and connects the portable terminal to communication network by initializing the terminal using the information provided on the inserted SIM card. The portable terminal may then be placed in an idle mode.

In another aspect of the invention, the controller 10 may be connected to the fourth pin 320b of the SIM card connector 40 using an additional port such as an INT (Interrupt) port and thus may sense that the voltage level of the fourth pin 320b is changed in the predetermined pattern through the INT port. That is, an interrupt may be generated when a voltage on the SIM_IO (pin #4) 320b is grounded (by contact with the Ground (pin #6) 310a of the partially inserted SIM card and a second interrupt may be generated when the voltage on the SIM_IO pin 320b returns to the applied voltage (i.e., fully inserted SIM card). Alternatively, an interrupt may be generated when the voltage on SIM_IO pin 320b is grounded and after a fixed period of time, the controller may monitor the voltage on SIM_IO pin 320b to determine whether the voltage has returned to the applied voltage.

The embodiment of the present invention may be modified such that the controller 10 is connected to the fourth pin 320b of the SIM card connector 40 through a port including an inverse circuit with an inverse transistor. In this case, the electrical level of the fourth pin 320b may change in the pattern of low→high→low. Thus, the controller 10 may determine or sense that the SIM card has been inserted, if the electrical level of the fourth pin 320b changes in the pattern of low→high→low.

As described above, the present invention provides the method and apparatus for sensing insertion of a SIM card without using a sensor in addition to a conventional SIM card and a conventional SIM card connector. If a response signal has not been received from the SIM card in response to a confirm signal transmitted to the SIM card, it may be determined or sensed that the SIM card has been removed from the SIM card connector 40. The confirm signal transmitted to the SIM card by the controller 10 may be a clock signal, an I/O signal, or a reset signal. The SIM card may transmit an Answer To Reset (ATR) signal as the response signal.

As is apparent from the above description of the present invention, insertion of a SIM card can be sensed without using an additional sensor, thereby enabling realization of a small-size, lightweight portable terminal and reducing the fabrication cost of the portable terminal.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. An apparatus for detecting insertion of a Subscriber Identity Module (SIM) card in a portable terminal, the apparatus comprising:
   a SIM card connector into which the SIM card is inserted; and
   a controller configured to:
      control supplying operating voltage to a predetermined pin of the SIM card connector, prior to detecting insertion of the SIM card in the SIM card connector; and
      detect whether a voltage level of the predetermined pin changes from one of: i) high to low to high, or ii) low to high to low; if so, the controller detects insertion of the SIM card into the SIM card connector.

2. The apparatus of claim 1, wherein the predetermined pin is a SIM_IO (Input/Output) pin.

3. The apparatus of claim 1, wherein the controller is connected to the predetermined pin of the SIM card connector via a port including an inverse circuit.

4. A method for detecting insertion of a Subscriber Identity Module (SIM) card in a portable terminal having a SIM card connector, the method comprising:

supplying an operating voltage to a predetermined pin of the SIM card connector, prior to detecting insertion of the SIM card in the SIM card connector; and detecting whether a voltage level of the predetermined pin changes from one of: i) high to low to high; or ii) low to high to low; if so, detecting that SIM card has been inserted into the SIM card connector.

5. The method of claim 4, wherein the predetermined pin is an SIM_IO (Input/Output) pin.

6. A portable terminal comprising:

a SIM card insertion slot comprising a plurality of connection pins;

means configured to apply a voltage to a predetermined one of the plurality of pins, prior to a detection that a SIM card has been inserted into the SIM card insertion slot; and a controller configured to detect whether a voltage level of the predetermined one of the plurality pins changes from one of: i) high to low to high, or ii) low to high to low; if so, the controller detects insertion of the SIM card into the SIM card insertion slot.

7. The terminal of claim 6, wherein the controller further configured to:

measure the voltage level on the predetermined one of the plurality of pins.

8. The terminal of claim 6, wherein the controller further configured to:

accept a generated interrupt.

9. The terminal of claim 6, wherein the controller further configured to:

access information contained on the inserted SIM card to initialize the portable terminal.

\* \* \* \* \*